US012634900B2

(12) United States Patent
Li et al.

(10) Patent No.: US 12,634,900 B2
(45) Date of Patent: May 19, 2026

(54) FRAME STRUCTURE CONFIGURATION METHOD AND APPARATUS, ELECTRONIC DEVICE AND COMPUTER-READABLE STORAGE MEDIUM

(71) Applicant: ZTE CORPORATION, Shenzhen (CN)

(72) Inventors: Shulin Li, Shenzhen (CN); Jianbin Gong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 326 days.

(21) Appl. No.: 18/267,525

(22) PCT Filed: Dec. 13, 2021

(86) PCT No.: PCT/CN2021/137425

§ 371 (c)(1),
(2) Date: Jun. 15, 2023

(87) PCT Pub. No.: WO2022/135204

PCT Pub. Date: Jun. 30, 2022

(65) Prior Publication Data

US 2024/0049196 A1     Feb. 8, 2024

(30) Foreign Application Priority Data

Dec. 24, 2020    (CN) .......................... 202011545239.9

(51) Int. Cl.
*H04W 72/0446*        (2023.01)
*H04L 27/26*          (2006.01)

(52) U.S. Cl.
CPC ..... *H04W 72/0446* (2013.01); *H04L 27/2605* (2013.01)

(58) Field of Classification Search
CPC ....................... H04W 72/0446; H04L 27/2605
See application file for complete search history.

(56) References Cited

U.S. PATENT DOCUMENTS 10,084,535  B1 *   9/2018   Speidel ............... H04B 7/18543
10,924,889  B1 *   2/2021   Omer .................... G01S 13/003
(Continued)

FOREIGN PATENT DOCUMENTS

CN        101499889 B      9/2011
CN        102811191 A     12/2012
(Continued)

OTHER PUBLICATIONS

Reference translation.*

(Continued)

*Primary Examiner* — Khaled M Kassim

(74) *Attorney, Agent, or Firm* — Li & Cai Intellectual Property (USA) Office

(57)            ABSTRACT

The present application provides a frame structure configuration method, a frame structure configuration apparatus, an electronic device and a computer readable storage medium, the frame structure configuration method includes: obtaining a real-time distance between a base station and a terminal; determining the number of time slots occupied by a guard period (GP) according to the real-time distance and a propagation speed of a wireless signal; and according to the number of the time slots occupied by the GP, the number of uplink time slots and the number of downlink time slots, determining an adaptive frame structure for data transmission between the base station and the terminal.

13 Claims, 5 Drawing Sheets

(56) References Cited

U.S. PATENT DOCUMENTS

| | | | | |
|---|---|---|---|---|
| 2005/0094605 A1* | 5/2005 | Sun | | H04B 7/2646 370/347 |
| 2010/0131814 A1* | 5/2010 | Chiu | | H04L 1/1822 714/E11.131 |
| 2010/0238847 A1* | 9/2010 | Suo | | H04B 7/2643 370/280 |
| 2010/0246456 A1* | 9/2010 | Suo | | H04B 7/2656 370/336 |
| 2010/0278080 A1* | 11/2010 | Pan | | H04W 56/003 370/280 |
| 2013/0215844 A1* | 8/2013 | Seol | | H04W 72/046 370/329 |
| 2015/0117270 A1* | 4/2015 | Um | | H04W 72/0446 370/278 |
| 2015/0373430 A1* | 12/2015 | Kim | | H04Q 11/0067 398/48 |
| 2017/0142702 A1* | 5/2017 | Yu | | H04W 72/20 |
| 2017/0142743 A1* | 5/2017 | Yoon | | H04W 56/00 |
| 2018/0234219 A1* | 8/2018 | Sridharan | | H04L 5/023 |
| 2018/0295618 A1* | 10/2018 | Au | | H04W 72/23 |
| 2018/0359752 A1* | 12/2018 | Au | | H04W 72/0446 |
| 2019/0104514 A1* | 4/2019 | Chendamarai Kannan | | H04L 1/00 |
| 2019/0141680 A1 | 5/2019 | Hu | | |
| 2019/0159251 A1* | 5/2019 | Li | | H04L 1/18 |
| 2019/0296863 A1* | 9/2019 | Hu | | H04W 72/23 |
| 2019/0357224 A1 | 11/2019 | Li | | |
| 2020/0145175 A1* | 5/2020 | Hassan Hussein | | H04W 72/541 |
| 2020/0359223 A1* | 11/2020 | Kim | | H04W 72/23 |
| 2021/0194734 A1* | 6/2021 | Herath | | H04W 56/0005 |
| 2021/0376960 A1* | 12/2021 | Huang | | H04L 5/0091 |
| 2022/0416982 A1* | 12/2022 | Lyu | | H04W 72/20 |
| 2024/0276404 A1* | 8/2024 | Rico Alvarino | | H04L 5/0092 |

FOREIGN PATENT DOCUMENTS

| | | | | |
|---|---|---|---|---|
| CN | 107124384 A | 9/2017 | | |
| CN | 107306450 A | 10/2017 | | |
| CN | 109196803 A | 1/2019 | | |
| CN | 110035521 A | 7/2019 | | |
| CN | 107124384 B | * 10/2019 | | H04L 27/2605 |
| CN | 110868722 A | 3/2020 | | |
| CN | 113543332 A | 10/2021 | | |
| EP | 3002979 A1 | * 4/2016 | | H04W 56/0045 |
| WO | WO 2019028369 A1 | 2/2019 | | |

OTHER PUBLICATIONS

WIPO, International Search Report issued on Jan. 27, 2022.

Fujitsu. "Guard period setting in TDD based NR frame structure," 3GPP TSG RAN WG1 Meeting #87 R1-1611459 issued on Nov. 4, 2016.

ZTE. "PUSCH enhancements for NR URLLC," 3GPP TSG RAN WG1 #96bis R1-1904145 issued on Apr. 3, 2019.

CN202011545239.9 First Office Action issued on Feb. 21, 2022.

CN202011545239.9 Second Office Action issued on Apr. 27, 2022.

European Patent Office, the Extended European Search Report dated Oct. 10, 2024, for corresponding EP application No. 21909201.2.

* cited by examiner

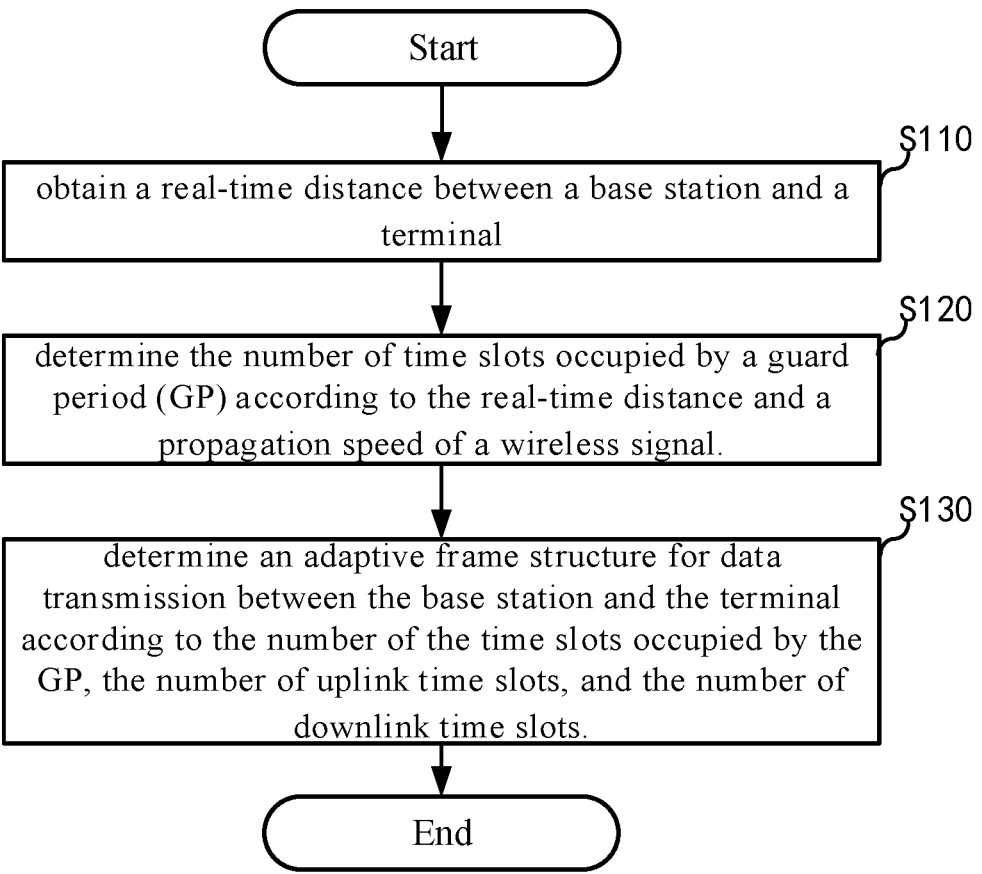

Start obtain a real-time distance between a base station and a terminal ∫S110 determine the number of time slots occupied by a guard period (GP) according to the real-time distance and a propagation speed of a wireless signal. ∫S120 determine an adaptive frame structure for data transmission between the base station and the terminal according to the number of the time slots occupied by the GP, the number of uplink time slots, and the number of downlink time slots. ∫S130

End

Fig. 1

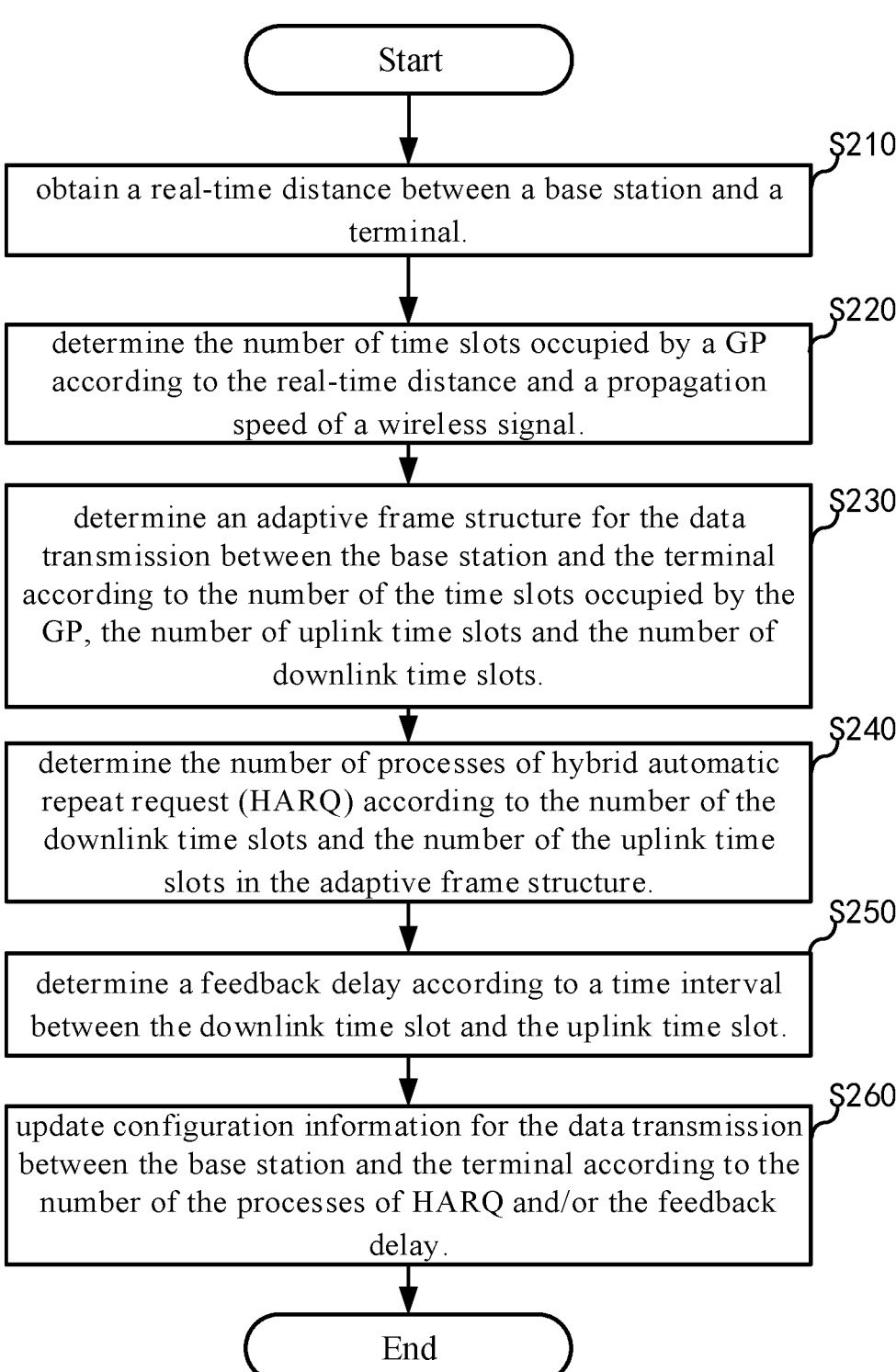

Start

S210
obtain a real-time distance between a base station and a terminal.

S220
determine the number of time slots occupied by a GP according to the real-time distance and a propagation speed of a wireless signal.

S230
determine an adaptive frame structure for the data transmission between the base station and the terminal according to the number of the time slots occupied by the GP, the number of uplink time slots and the number of downlink time slots.

S240
determine the number of processes of hybrid automatic repeat request (HARQ) according to the number of the downlink time slots and the number of the uplink time slots in the adaptive frame structure.

S250
determine a feedback delay according to a time interval between the downlink time slot and the uplink time slot.

S260
update configuration information for the data transmission between the base station and the terminal according to the number of the processes of HARQ and/or the feedback delay.

End

Fig. 2

| Frame Structure |
| Configuration |
| Apparatus |
| 611 |

Base Station 610

| Frame Structure |
| Configuration |
| Apparatus |
| 711 |

Terminal 710

| 5G Base Station 810 | 5G Terminal 820 |

| System frame number | n | | | | | | | | | | | | | | | | | | | n+1 | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| Time slot number | 0 | 1 | 2 | 3 | 4 | 5 | 6 | 7 | 8 | 9 | 10 | 11 | 12 | 13 | 14 | 15 | 16 | 17 | 18 | 0 | 1 | 2 | 3 | 4 | 5 | 6 | 7 | 8 | 9 | 10 | 11 | 12 | 13 | 14 | 15 | 16 | 17 | 18 | 19 |
| Time slot type | D | D | D | D | D | D | D | D | D | D | D | D | D | D | D | D | D | D | D | D | D | D | D | D | D | D | D | D | D | D | D | D | D | D | D | F | U | U | U |

| System frame number | n | | | | | | | | | | | | | | | | | | | n+1 | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| Time slot number | 0 | 1 | 2 | 3 | 4 | 5 | 6 | 7 | 8 | 9 | 10 | 11 | 12 | 13 | 14 | 15 | 16 | 17 | 18 | 0 | 1 | 2 | 3 | 4 | 5 | 6 | 7 | 8 | 9 | 10 | 11 | 12 | 13 | 14 | 15 | 16 | 17 | 18 | 19 |
| Time slot type | D | D | D | D | D | D | D | D | D | D | D | D | D | D | D | D | D | D | D | D | D | D | D | D | D | D | D | D | D | D | D | D | D | D | D | F | U | U | U |

1

FRAME STRUCTURE CONFIGURATION METHOD AND APPARATUS, ELECTRONIC DEVICE AND COMPUTER-READABLE STORAGE MEDIUM

CROSS-REFERENCE TO RELATED APPLICATIONS

The present application claims the priority of Chinese Patent Application No. 202011545239.9, filed on Dec. 24, 2020, the contents of which are incorporated herein in their entirety by reference.

TECHNICAL FIELD

The present disclosure relates to the field of wireless communication technology, and in particular, to a frame structure configuration method, a frame structure configuration apparatus, an electronic device, and a computer-readable storage medium.

BACKGROUND

With the rapid development of wireless communication technology, and the introduction of large bandwidth, low time delay and multi-antenna technology, a wireless communication network can ensure to support a transmission of a larger data flow and a wider cell coverage.

For a cell with a ultra-long coverage, since a distance between a base station and a terminal is relatively long, a frame structure for the ultra-long coverage in a 5th generation wireless communication system (5G) is a fixed frame structure, and if a frame structure for transmitting data is configured according to the fixed frame structure corresponding to a maximum coverage distance supported by the cell, a problem that radio resources may be wasted when the terminal (for example, the terminal close to the base station) communicates with the base station.

SUMMARY

The present application provides a frame structure configuration method, including: obtaining a real-time distance between a base station and a terminal; determining the number of time slots occupied by a guard period (GP) according to the real-time distance and a propagation speed of a wireless signal; and according to the number of the time slots occupied by the GP, the number of uplink time slots and the number of downlink time slots, determining an adaptive frame structure for a data transmission between the base station and the terminal.

The present application provides a frame structure configuration apparatus, including: a distance determination module, configured to obtain a real-time distance between a base station and a terminal; a calculation module, configured to determine the number of time slots occupied by a GP according to the real-time distance and a propagation speed of a wireless signal; and a frame structure configuration module, configured to determine an adaptive frame structure for a data transmission between the base station and the terminal, according to the number of the time slots occupied by the GP, the number of uplink time slots and the number of downlink time slots.

The present application provides an electronic device, including: at least one processor; a memory having at least one computer program stored thereon, the at least one computer program, executed by the at least one processor, causes the at least one processor to implement the frame structure configuration method of the present application.

The present application provides a computer-readable storage medium, storing a computer program thereon, the computer program, executed by a processor, causes the processor to implement a frame structure configuration method of the present application.

With respect to the above and other aspects of the present application, further description is provided in the accompanying drawings, detailed description and claims.

DESCRIPTION OF DRAWINGS

FIG. 1 is a flowchart of a frame structure configuration method according to the present application.

FIG. 2 is another flowchart of a frame structure configuration method according to the present application.

DESCRIPTION OF EMBODIMENTS

Figure 3:
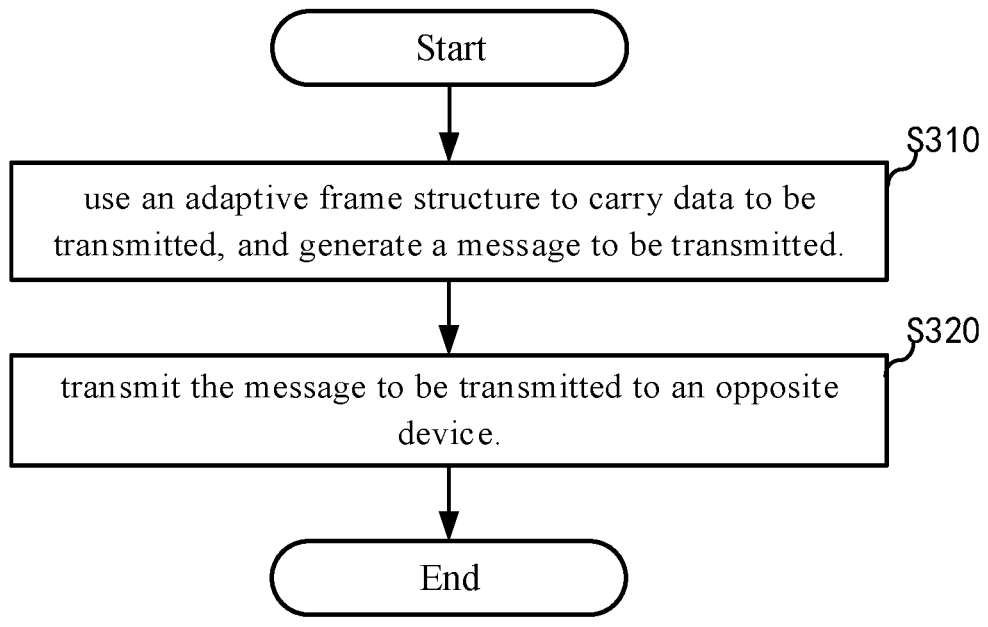
FIG. 3 is a flowchart of an information transmission method according to the present application.

To make the present application more apparent, embodiments of the present application will be described in detail below with reference to the accompanying drawings. In the present application, embodiments and features in the embodiments may be combined with each other without any conflict.

In time division duplexing (TDD) technology, since time lengths occupied by uplink and downlink may be flexibly configured. For example, for a download service of TDD, a downlink time length may be set to 70% and an uplink time length may be set to 30%, so that the spectrum utilization rate of TDD may be greatly improved. In frequency division duplexing (FDD) technology, spectrum resources are configured in pairs for uplink and downlink; by contrast, in the TDD technology, the uplink and the downlink may use a same spectrum resource, so that the fragmented spectrum resource can be utilized conveniently, causing the TDD technology more widely used.

However, for a cell with a ultra-long coverage, if the frame structure for uplink and downlink in the TDD technology is adopted, a guard period (GP) is desired to be considered. The GP is a guard interval between a transmission time slot and a reception time slot of a base station (or a terminal) to avoid confusion between the transmission time slot and the reception time slot. The GP includes a transmission delay and a conversion time of a device between transmitting and receiving, a length of the GP determines a maximum coverage area supported by the cell, and the GP provides a transition time for stability of conversion between radio frequency (RF) transmitting and receiving. If the frame structure for transmitting data is configured according to the maximum coverage radius supported by the cell, it may result in a waste of wireless resources used by the terminal (e.g., the terminal communicating with the base station within a relatively short distance from the base station).

FIG. 1 shows a flowchart of a frame structure configuration method according to the present application. The frame configuration method may be applied to a frame configuration apparatus, and the frame configuration apparatus may be arranged in a base station or a terminal. As shown in FIG. 1, the frame structure configuration method in an embodiment of the present application includes following steps S110 to S130.

At step S110, obtaining a real-time distance between a base station and a terminal.

The real-time distance is an actual distance between the base station and the terminal, and the distance between the terminal and the base station may be determined according to a condition of real-time moving of the terminal. The base station may be a macro base station or a micro base station in a 5G network, the terminal may be devices such as a smart phone, a mobile terminal in the 5G network, and the base station and the terminal may also be a 4G base station and a 4G terminal respectively in a 4th generation wireless communication system (4G). The above are only examples for types of the base station and the terminal, and the types of the base station and the terminal may be specifically limited according to actual situations and other types of base stations and terminals that are not described herein are also within the protection scope of the present application, and will not be detailed herein.

For example, the real-time distance between the base station and the terminal may be measured in real-time, or the real-time distance may be calculated and obtained according to an obtained data transmission time (for example, a time difference value relating to measurement information reported by the terminal) and a data transmission speed of the terminal. For example, if the time difference value between time information in a first real-time measurement information and time information in a second real-time measurement information reported by the terminal is about 1 millisecond, a propagation speed of a wireless signal is a speed of light (about 300000 km/s), the real-time distance between the base station and the terminal is about (0.001× 300000)=300 km. The above method is only an example for obtaining the real-time distance, and may be specifically set according to specific situations, and other methods for obtaining the real-time distance that are not described herein are also within the protection scope of the present application, and will not be detailed herein.

At step S120, determining the number of time slots occupied by a guard period (GP) according to the real-time distance and a propagation speed of a wireless signal.

It should be noted that the GP is a guard time interval for transmitting information from a transmitting end to a receiving end at a side of the base station, the GP is added between a downlink time slot and an uplink time slot, so as to ensure no inter-code crosstalk between an uplink symbol and a downlink symbol, and a cyclic prefix (CP) may be added in the GP to ensure mutual orthogonality of subcarriers.

At step S130, determining an adaptive frame structure for data transmission between the base station and the terminal according to the number of the time slots occupied by the GP, the number of uplink time slots, and the number of downlink time slots.

In some implementations, the adaptive frame structure includes at least one wireless super-frame, each wireless super-frame includes at least two wireless frames, each wireless frame includes at least N time slots, and N is an integer greater than or equal to 1.

For example, if a subcarrier spacing is about 30 KHz, each wireless frame includes 20 time slots, and then each wireless super-frame includes at least 40 time slots, each time slot includes 14 orthogonal frequency division multiplexing (OFDM) symbols, and by taking each wireless super-frame as a unit, the number of the time slots occupied by the GP in each wireless super-frame may be adjusted, so that more time slots are used for downlink data transmission, and downlink processing capability of the user is improved.

In the embodiment, the number of the time slots occupied by the GP is determined according to the real-time distance between the base station and the terminal and the propagation speed of the wireless signal; in a communication scenario of an ultra-long distance coverage, the number of the time slots occupied by the GP may be dynamically adjusted according to the real-time distance; according to the number of the time slots occupied by the GP, the number of the uplink time slots and the number of the downlink time slots, the adaptive frame structure for the data transmission between the base station and the terminal is determined, which can reduce the loss of time slot resources caused by the GP, avoid a waste of wireless resources, dynamically adjust the number of the downlink time slots according to the real-time distance between the terminal and the base station, improve the performance of the terminal in downlink services and improve the user experience.

In some implementations, the obtaining the real-time distance between the base station and the terminal in step S110 includes: extracting positioning information from a positioning system; and determining the real-time distance according to the positioning information.

For example, the positioning information of the base station and the terminal is obtained through any one or more of a global positioning system (GPS), a Beidou satellite navigation system, a Galileo satellite navigation system, and a Russian global navigation satellite system, so as to calculate the real-time distance between the base station and the terminal. It should be noted that, the positioning information obtained from different positioning systems may be different, but the positioning information includes the position of the terminal and the position of the base station, so that a relative position information between the terminal and the base station can be calculated, and the real-time distance between the base station and the terminal can be calculated, so as to ensure the accuracy of the real-time distance.

In some implementations, the obtaining the real-time distance between the base station and the terminal in step S110 includes: obtaining real-time measurement information reported by the terminal in real-time; and estimating the real-time distance according to the real-time measurement information.

For example, a current time information of the terminal may be extracted from the real-time measurement information reported by the terminal in real-time, a time difference value between the base station and the terminal may be obtained by comparing the current time information with the time information of the base station, and the real-time distance may be estimated according to the time difference value in combination with a real-time data transmission speed of the terminal.

By estimating the real-time distance between the base station and the terminal according to the real-time measurement information, the real-time distance can be quickly obtained, so that the adaptive frame structure used by the base station can be adjusted in real-time, the waste of time slot resources is avoided, and the communication efficiency between the terminal and the base station is improved.

In some implementations, the determining the number of the time slots occupied by the GP according to the real-time distance and the propagation speed of the wireless signal in step S120 includes: calculating a time length occupied by the GP according to the real-time distance and the propagation speed of the wireless signal; determining the number of OFDM symbols corresponding to the GP according to the time length occupied by the GP and a time length corresponding to each OFDM symbol; and determining the number of the time slots occupied by the GP according to the number of the OFDM symbols corresponding to the GP and the number of the OFDM symbols corresponding to each time slot.

Each OFDM symbol is a symbol for realizing parallel transmission of high-speed serial data through frequency division multiplexing, and the symbol has good multipath fading resistance and can support access of multiple users.

For example, the time length occupied by the GP is determined according to a ratio between the real-time distance and the propagation speed of the wireless signal; then, according to the time length corresponding to each OFDM symbol, the number of the OFDM symbols included in the time length occupied by the GP can be determined. For example, if the time length occupied by the GP is 140 ms and the time length corresponding to each OFDM symbol is 10 ms, the number of the OFDM symbols included in the GP is 140/10=4.

For example, if the real-time distance is about 300 km and the subcarrier spacing is about 30 KHz (the number of the OFDM symbols per time slot corresponding to the subcarrier spacing is 14), it can be determined that the number of the OFDM symbols corresponding to the GP is about 56 and the number of the time slots occupied by the GP is about 4. The number of the time slots occupied by the GP may be adjusted in real-time according to the real-time distance between the base station and the terminal, so as to reduce the number of the time slots occupied by the GP and increase the number of the downlink time slots, so that the real-time processing capacity of downlink services is improved, and the user experience is improved.

In some implementations, after the step S130 of determining the adaptive frame structure for the data transmission between the base station and the terminal according to the number of the time slots occupied by the GP, the number of the uplink time slots and the number of the downlink time slots, the frame structure configuration method further includes: updating configuration information corresponding to the adaptive frame structure to generate an updated configuration information of the frame structure; generating an updating message according to the updated configuration information of the frame structure; and updating the adaptive frame structure according to the updating message.

The configuration information may include any one or more of the number of the uplink time slots, the number of the downlink time slots, the number of uplink symbols, the number of downlink symbols, an uplink transmission period, or a downlink transmission period. The above configuration information is to be updated synchronously as the adaptive frame structure changes. The base station sends the updated configuration information of the frame structure to the terminal, so that the terminal can communicate with the base station by using the same adaptive frame structure, so as to improve the communication quality.

The updated configuration information of the frame structure includes: any one or more of the number of the uplink time slots, the number of the downlink time slots, the number of the uplink symbols, the number of the downlink symbols, the uplink transmission period and the downlink transmission period. It should be noted that the updated configuration information of the frame structure is not limited to the above information, and the above updated configuration information of the frame structure is only an example, and may be specifically set according to an actual situation, and other updated configuration information of the frame structure that is not described herein is also within the protection scope of the present application, and will not be detailed herein.

In some implementations, in response to that there are multiple terminals, the base station may calculate, in real-time, the time length occupied by the GP corresponding to the terminal farthest from the base station in a current cell, update the adaptive frame structure according to the time length occupied by the GP, and send configuration information corresponding to the updated adaptive frame structure to all terminals, so that all terminals in the cell can communicate with the base station by using the same frame structure, such that the communication efficiency is improved.

In some implementations, the updating the adaptive frame structure according to the updating message includes: according to the updating message, updating the frame structure used by the base station and the terminal into the adaptive frame structure.

For example, if it is determined that the adaptive frame structure is generated by the base station, the base station generates a re-configuration message according to configuration information corresponding to the adaptive frame structure, and sends the re-configuration message to the terminal, so that the terminal can update the frame structure according to the re-configuration message, and frame structures used by the base station and the terminal during communication are the same, thereby avoiding a parsing error during the communication, improving the communication quality between the base station and the terminal, and improving the user experience.

In some implementations, the updating the adaptive frame structure according to the updating message includes: updating the frame structure used by the terminal into the adaptive frame structure according to the updating message; and keeping the frame structure used by the base station unchanged, and enabling the base station to parse each received communication message sent by the terminal according to the updating message.

For example, if it is determined that the adaptive frame structure is generated by the terminal, the terminal generates and sends a real-time scheduling message to the base station according to the updated configuration information, and the base station still transmits data according to a preset "initial configuration frame structure", but for the communication message sent by the terminal, the message sent by the terminal may be parsed and checked by using the updated configuration information, so as to ensure the accuracy of the information obtained from the terminal.

In some implementations, after the step S130 of determining the adaptive frame structure for the data transmission between the base station and the terminal according to the number of the time slots occupied by the GP, the number of the uplink time slots and the number of the downlink time slots, the frame structure configuration method further includes: dynamically updating the adaptive frame structure according to the real-time distance and a preset distance threshold.

For example, the adaptive frame structure includes at least one wireless super-frame, each wireless super-frame includes at least two wireless frames, each wireless frame includes at least N time slots, and N is an integer greater than or equal to 1.

The real-time distance may change in real-time according to the condition of real-time moving of the terminal. For example, within a preset time length (for example, the preset time length is 5 seconds), the real-time distance between the terminal and the base station changes from 300 kilometers to 250 kilometers, and a change value of the real-time distance reaches or exceeds a preset distance threshold (for example, the preset distance threshold is 50 kilometers), the base station and the terminal may automatically update the adaptive frame structure, that is, the adaptive frame structure is updated from the frame structure corresponding to 300 kilometers to the frame structure corresponding to 250 kilometers, so as to reduce the number of the time slots occupied by the GP, increase the number of the time slots occupied by the downlink time slots, avoid a waste of wireless resources, and improve the downlink service processing capability.

FIG. 2 shows another flow chart of a frame structure configuration method in an embodiment of the present application. As shown in FIG. 2, the frame structure configuration method may be applied to a frame structure configuration apparatus, and the frame structure configuration apparatus may be disposed in a base station or a terminal. As shown in FIG. 2, the frame structure configuration method in the embodiment of the present application may include following steps S210 to S260.

At step S210, obtaining a real-time distance between a base station and a terminal.

At step S220, determining the number of time slots occupied by a GP according to the real-time distance and a propagation speed of a wireless signal.

At step S230, determining an adaptive frame structure for data transmission between the base station and the terminal according to the number of the time slots occupied by the GP, the number of uplink time slots and the number of downlink time slots.

It should be noted that steps S210 to S230 in the present embodiment are the same as steps S110 to S130 in the previous embodiment, and are not repeated herein.

At step S240, determining the number of processes of hybrid automatic repeat request (HARQ) according to the number of the downlink time slots and the number of the uplink time slots in the adaptive frame structure.

The adaptive frame structure may include a downlink time slot, an uplink time slot, and a special time slot. Due to time-varying characteristics of a wireless channel, multipath fading, and some unpredictable interference, which may cause transmission failure of a wireless signal, a forward error correction (FEC) coding technology and an automatic repeat-request (ARQ) method are usually used to perform error controlling, so as to ensure service quality in a communication process.

In most wireless packet transmission systems, both the ARQ and the FEC will be used in combination, that is, a hybrid automatic repeat request (HARQ) mechanism is adopted. The FEC is used in the HARQ to reduce the number of re-transmissions and an error rate; a re-transmission with the ARQ and a cyclic redundancy check (CRC) are used to satisfy an expectation for the error rate of a packet data transmission. The HARQ mechanism automatically corrects errors within an error correction capability thereof, to increase the reliability of the communication system and improve the transmission efficiency of the communication system. The number of the processes of HARQ may include the number of processes of uplink HARQ and the number of processes of downlink HARQ. During the terminal processing downlink services, the number of the processes of downlink HARQ affects the downlink processing capability of the terminal.

It should be noted that, if the number of the downlink time slots and the number of the uplink time slots in the adaptive frame structure remain unchanged, the number of the processes of HARQ also remains unchanged, and the number of the processes of HARQ is the maximum number of the processes of HARQ that can be supported by the current adaptive frame structure. For example, if it is determined that the number of the processes of HARQ is 16, it indicates that in the current adaptive frame structure, a 4-bit space is to be used to characterize the number of the processes of HARQ, and the 4-bit space is to be reflected in the configuration information for the data transmission between the base station and the terminal, so as to ensure consistency between the base station and the terminal during the data transmission.

At step S250, determining a feedback delay according to a time interval between the downlink time slot and the uplink time slot.

For example, if a distance between a first uplink time slot and a first downlink time slot is equal to 33 time slots (including 29 downlink time slots and 4 special time slots), then an average method will be used to correspond each uplink time slot to the corresponding downlink time slot. For example, if one uplink time slot corresponds to six downlink time slots, the feedback delay is the time length corresponding to six time slots. The index value of the default time domain resource indication K1 list in the 5G communication protocol may also be used to characterize the feedback delay.

At step S260, updating configuration information for data transmission between the base station and the terminal according to the number of the processes of HARQ and/or the feedback delay.

The number of the processes of HARQ and the feedback delay are desired to be written into the configuration information by using binary numbers, for example, if the number of the processes of HARQ is 16, a 4-bit space is desired to represent the number of the processes of HARQ; if the feedback delay is 32 ms, a 5-bit space is desired to represent the feedback delay, and thus the data transmission capacity is reduced. In a case where the number of the processes of HARQ and/or the feedback delay changes, the configuration information for the data transmission between the base station and the terminal is to be updated synchronously, so as to ensure that configurations of the terminal and the base station are the same, thereby avoiding errors of message parsing that affect communication quality.

In the embodiment, the number of the time slots occupied by the GP is determined according to the real-time distance between the base station and the terminal and the propagation speed of the wireless signal; in a communication scenario of an ultra-long distance coverage, the number of the time slots occupied by the GP can be dynamically adjusted according to the real-time distance; according to the number of the time slots occupied by the GP, the number of the uplink time slots and the number of the downlink time slots, the adaptive frame structure for the data transmission between the base station and the terminal is determined, which can reduce the loss of time slot resources caused by the GP, avoid a waste of wireless resources, and dynamically adjust the number of the downlink time slots according to the real-time distance between the terminal and the base station, improve the performance of the terminal for downlink services. Moreover, according to the number of the processes of HARQ and/or the feedback delay, the configuration information for the data transmission between the base station and the terminal is updated, which increases the reliability of the communication system and improves the transmission efficiency of the communication system.

In some implementations, the determining the number of the processes of hybrid automatic repeat request (HARQ) according to the number of the downlink time slots and the number of the uplink time slots in the adaptive frame structure in step S240 includes: determining the number of processes of downlink HARQ according to the number of the downlink time slots; determining the number of processes of uplink HARQ according to a corresponding relation of transmission delay between the uplink time slot and the downlink time slot; and determining the number of the processes of HARQ according to the number of the processes of downlink HARQ and the number of the processes of uplink HARQ.

For example, in a 5G low-frequency communication scenario, since a wireless super-frame is used as the adaptive frame structure, each wireless super-frame includes 40 time slots, if there are 30 downlink time slots in each wireless super-frame, the maximum number of the processes of HARQ that can be supported by downlink is 30, and the number of the time slots occupied by the GP may be dynamically adjusted according to the real-time distance between the terminal and the base station. In general, each uplink time slot corresponds to six downlink time slots, and if the adaptive frame structure includes 30 downlink time slots and 4 special (F) time slots (i.e., the time slots occupied by the GP), the number of the uplink time slots corresponding to the adaptive frame structure is 6, that is, a first uplink time slot corresponds to 0-th to 5-th downlink time slots of a first wireless frame, a second uplink time slot corresponds to 6-th to 11-th downlink time slots of the first wireless frame, a third uplink time slot corresponds to 12-th to 17-th downlink time slots of the first wireless frame, a fourth uplink time slot corresponds to 18-th to 19-th downlink time slots of the first wireless frame and 0-th to 3-rd downlink time slots of a second wireless frame, a fifth uplink time slot corresponds to 4-th to 9-th downlink time slots of the second wireless frame, and a sixth uplink time slot corresponds to 0F to 3F time slots, so as to ensure the synchronization between the uplink time slots and the downlink time slots.

By determining the number of the processes of downlink HARQ according to the number of the downlink time slots, determining the number of the processes of uplink HARQ according to the corresponding relation of transmission delay between the uplink time slot and the downlink time slot, the number of the processes of uplink HARQ and the number of the processes of downlink HARQ can be adjusted in real-time according to the real-time distance between the base station and the terminal, errors are automatically corrected within the error correction capability, and the transmitting end is desired to re-transmit if any error exceeds the error correction capability, which not only increases the reliability of the communication system, but also improves the transmission efficiency of the communication system.

In some implementations, the updating the configuration information for the data transmission between the base station and the terminal according to the number of the processes of HARQ and/or the feedback delay in step S260 includes: generating downlink control information (DCI) according to the number of the processes of HARQ and/or the feedback delay; updating configuration information of a physical uplink control channel (PUCCH) according to the DCI, and generating updated configuration information of the PUCCH, where the updated configuration information of the PUCCH is used for the data transmission between the base station and the terminal.

The feedback delay K1 for the 5G low frequency communication may be characterized by an index value of a default time domain resource indication K1 list in the 5G communication protocol. For example, the index value may be configured in a feedback delay indicator (PDSCH-to-HARQ_feedback timing indicator), from a physical downlink shared channel (PDSCH) to HARQ, in the configuration information.

The DCI is generated by configuring the feedback delay K1 into the feedback delay indicator (PDSCH-to-HARQ_feedback timing indicator) and then combining the number of the processes of HARQ; and the DCI is updated into the configuration information of the physical uplink control channel (PUCCH), so as to ensure normal data transmission between the base station and the terminal and avoid data transmission errors.

It should be noted that, during a normal communication (i.e., in a non-ultra-long coverage scenario), the configuration information occupies a 8-bit space in the configuration information of the PUCCH, but in the embodiment, since the wireless super-frame is used as a configuration unit of the adaptive frame structure, the number of bits, occupied by the feedback delay K1 and information of the number of the processes of HARQ, already exceeds 8 bits, and idle bits in other fields are to be occupied, so as to ensure the normal communication.

In some implementations, the generating the DCI according to the number of the processes of HARQ and/or the feedback delay includes: calculating a byte length, to be filled, occupied by the number of the processes of HARQ and/or the feedback delay; increasing a transmission byte length occupied by the DCI according to the byte length to be filled and a byte length for filling preset information, and generating new DCI; and filling the number of the processes of HARQ and/or the feedback delay into the new DCI.

For example, the byte length for filling preset information is 8 bits, the byte length for representing the number of the processes of HARQ in the DCI is increased from original 4 bits to 6 bits according to the number of bytes to be occupied by the real-time number of the processes of HARQ and the feedback delay, and meanwhile, the byte length for representing the feedback delay in the DCI is increased from original 4 bits to 6 bits, the byte length to be filled is 12 bits, the transmission byte length occupied by the DCI is to be increased by 12−8=4 bits, that is, 4 bits are to be additionally added, so as to generate the new DCI.

By generating the new DCI by increasing the transmission byte length occupied by the DCI, filling the number of the processes of HARQ and/or the feedback delay into the new DCI, the integrity of the DCI can be ensured, an omission and errors of the transmission information can be avoided, and the accuracy of the communication between the base station and the terminal can be ensured.

In some implementations, the generating the DCI according to the number of the processes of HARQ and/or the feedback delay includes: calculating a byte length, to be filled, occupied by the number of the processes of HARQ and/or the feedback delay; and filling the number of the processes of HARQ and/or the feedback delay into the DCI according to the byte length to be filled, a length of an idle field in the DCI and a preset filling byte length.

For example, the length of the idle field in the DCI is 8 bits, the preset filling byte length is 8 bits (that is, a sum of the byte length of 4 bits of the number of the processes of HARQ and the byte length of 4 bits of the feedback delay during the normal communication), and the length of the time slots occupied by the GP in the adaptive frame structure is dynamically adjusted according to the real-time distance between the base station and the terminal, so that the number of the processes of HARQ and/or the feedback delay are changed, for example, if the byte length to be filled is changed to 12 bits, 4 bits in the idle field in the DCI are to be occupied, so as to ensure the integrity of the information relating to the number of the processes of HARQ and/or the feedback delay.

In some implementations, an identification may be used to characterize the number of the processes of HARQ, for example, if the number of the processes of HARQ is 32, one bit in the idle field in the DCI is used to characterize the number of the processes of HARQ, that is, if the idle bit is identified as 0, it indicates that the current number of the processes of HARQ is a normal number (for example, any value, such as 12 or 13, less than 16); if the idle bit is identified as 1, it indicates that the current number of the processes of HARQ is a sum of the normal number plus 16 (i.e., 12+16, or 13+16, etc.).

The number of the processes of HARQ and/or the feedback delay being transmitted by occupying the idle field in the DCI can avoid the resource waste of the idle field, ensure the integrity of data transmission, and improve the data transmission efficiency.

FIG. 3 shows a flowchart of an information transmission method in an embodiment of the present application. The information transmission method may be applied to a base station or a terminal. As shown in FIG. 3, the information transmission method may include following steps S310 and S320.

At step S310, using an adaptive frame structure to carry data to be transmitted, and generating a message to be transmitted.

The adaptive frame structure may be the adaptive frame structure in any embodiment of the present application. The data to be transmitted may be service data of a certain service, for example, if a user downloads a video file, the data to be transmitted is the video file to be downloaded. The data to be transmitted is only described by examples, and may be specifically set according to actual situations, and other types of data to be transmitted not described herein are also within the protection scope of the present application, and will not be detailed herein.

For example, if the subcarrier spacing is 30 KHz, each time slot occupies 14 OFDM symbols, and in a case where the real-time distance between the base station and the terminal is 150 kilometers, the adaptive frame structure for carrying data to be transmitted may include the GP which occupies 2 special time slots, 32 downlink time slots, and 6 uplink time slots. In a case where the real-time distance between the base station and the terminal is 100 kilometers, at least 19 OFDM symbols are desired by the GP in the adaptive frame structure for carrying data to be transmitted, that is, the GP occupies one complete F slot (a first F slot), and also occupies five OFDM symbols in a second F slot, and the remaining nine OFDM symbols in the second F slot may be used for transmitting uplink symbols or downlink symbols. Moreover, the adaptive frame structure further includes 32 downlink time slots and 6 uplink time slots. In this case, since the real-time distance between the base station and the terminal is shortened relative to 150 km, 9 OFDM symbols are vacated for transmitting uplink data or downlink data, thereby improving the efficiency of data transmission.

At step S320, transmitting the message to be transmitted to an opposite device.

The opposite device may be a base station or a terminal. The opposite device is a device that communicates with the present device applied with the information transmission method in the embodiment of the present application, for example, if the device that executes the information transmission method is a base station, the opposite device is a terminal corresponding to the base station; if the device executing the information transmission method is a terminal, the opposite terminal device is a base station corresponding to the terminal. The above-mentioned opposite device is only an example, and specific settings may be performed according to actual situations, and other types of opposite devices that are not described herein are also within the protection scope of the present application, and will not be detailed herein.

In the embodiment, by generating the message to be transmitted by adopting any adaptive frame structure, for carrying data to be transmitted, in the embodiment, and transmitting the message to be transmitted to the opposite device, the adaptive frame structure can be dynamically adjusted as varying of the real-time distance between the terminal and the base station, a waste of wireless resources can be avoided, the performance of the terminal in downlink services is improved, and the user experience is improved.

Figure 4:
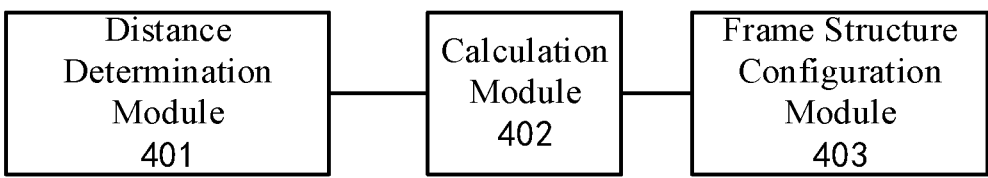
FIG. 4 is a schematic structural diagram of a frame structure configuration apparatus according to the present application.

The following describes a frame structure configuration apparatus according to an embodiment of the present application in detail with reference to the accompanying drawings. FIG. 4 shows a schematic structural diagram of a frame structure configuration apparatus according to an embodiment of the present application. As shown in FIG. 4, the frame structure configuration apparatus may include a distance determination module 401, a calculation module 402, and a frame structure configuration module 403.

The distance determination module 401 is configured to obtain a real-time distance between a base station and a terminal; the calculation module 402 is configured to determine the number of time slots occupied by a GP according to the real-time distance and a propagation speed of a wireless signal; and the frame structure configuration module 403 is configured to determine an adaptive frame structure for data transmission between the base station and the terminal according to the number of the time slots occupied by the GP, the number of uplink time slots, and the number of downlink time slots.

According to the frame structure configuration apparatus in the embodiment of the present application, the distance determination module 401 obtains the real-time distance between the base station and the terminal; then, the calculation module 402 determines the number of the time slots occupied by the GP according to the real-time distance and the propagation speed of the wireless signal; in a communication scenario of an ultra-long distance coverage, the number of the time slots occupied by the GP can be dynamically adjusted according to the real-time distance between the base station and the terminal; the frame structure configuration module 403 determines the adaptive frame structure for data transmission between the base station and the terminal according to the number of the time slots occupied by the GP, the number of the uplink time slots, and the number of the downlink time slots, which can reduce the loss of time slot resources caused by the GP, avoid a waste of wireless resources, and dynamically adjust the number of the downlink time slots according to the real-time distance between the terminal and the base station, improving the performance of the terminal during downlink services and improving the user experience.

Figure 5:
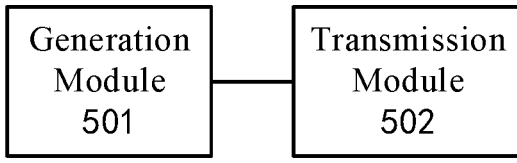
FIG. 5 is a schematic structural diagram of an information transmission apparatus according to the present application.

FIG. 5 shows a schematic structural diagram of an information transmission apparatus according to an embodiment of the present application. As shown in FIG. 5, the information transmission apparatus may include a generation module 501 and a transmission module 502.

The generating module 501 is configured to use any adaptive frame structure, in the embodiment of the present application, for carrying data to be transmitted, and generate a message to be transmitted; and the transmission module 502 is configured to transmit the message to be transmitted to an opposite device.

In the embodiment, the generation module 501 uses any adaptive frame structure, in the embodiment, for carrying data to be transmitted, and generates the message to be transmitted; the transmission module 502 transmits the message to be transmitted to the opposite device, and thus a waste of wireless resources can be avoided, the adaptive frame structure can be dynamically adjusted according to the real-time distance between the terminal and the base station, thereby improving the performance of the terminal during downlink services and improving the user experience.

Figures 6, 7, 8, 9:
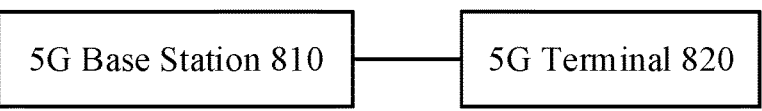
FIG. 6 is a schematic structural diagram of a base station according to the present application.
FIG. 7 is a schematic structural diagram of a terminal according to the present application.
FIG. 8 is a schematic structural diagram of a frame structure configuration system according to the present application.
FIG. 9 is a schematic composition diagram of an adaptive frame structure for a distance between a 5G base station and a 5G terminal being about 300 km or about 250 km according to the present application.

FIG. 6 shows a schematic structural diagram of a base station according to an embodiment of the present application. As shown in FIG. 6, the base station 610 may include a frame structure configuration apparatus 611, and the frame structure configuration apparatus 611 may be configured to implement the frame structure configuration method according to the embodiment of the present application.

For example, the base station 610 dynamically adjusts the adaptive frame structure between the terminal and the base station according to the real-time distance between the terminal and the base station through the frame structure configuration apparatus 611, generates a re-configuration message according to the adaptive frame structure, and sends the re-configuration message to the terminal, so that the terminal can update the frame structure to the adaptive frame structure, so as to ensure that frame structures between the terminal and the base station are the same.

According to the base station 610 in the embodiment of the present application, the adaptive frame structure in the communication can be adjusted in real-time through the frame structure configuration apparatus 611 in the base station 610, the number of the OFDM symbols occupied by the GP is dynamically adjusted, which can reduce the loss of time slot resources caused by the GP, avoid a waste of wireless resources, and dynamically adjust the number of the downlink time slots according to the real-time distance between the terminal and the base station, improve the performance of the terminal during downlink services and improve the user experience.

FIG. 7 shows a schematic structural diagram of a terminal according to an embodiment of the present application. As shown in FIG. 7, the terminal 710 may include a frame structure configuration apparatus 711, where the frame structure configuration apparatus 711 is configured to implement the frame structure configuration method according to the embodiment of the present application.

For example, the terminal 710 dynamically adjusts the adaptive frame structure between the terminal and the base station according to the real-time distance between the terminal and the base station through the frame structure configuration apparatus 711, generates a report message according to the adaptive frame structure, and sends the report message to the base station, so that the base station can parse the message sent by the terminal 710 according to the adaptive frame structure, thereby avoiding communication obstacles caused by errors of message parsing and improving the user experience.

According to the terminal 710 in the embodiment of the present application, the adaptive frame structure in the communication can be dynamically adjusted through the frame structure configuration apparatus 711 in the terminal 710, the number of the OFDM symbols occupied by the GP is dynamically adjusted, which can reduce the loss of time slot resources caused by the GP, and avoid a waste of wireless resources; meanwhile, the base station can parse the message sent by the terminal according to the adaptive frame structure, so that communication obstacles caused by errors of message parsing are avoided, and the user experience is improved.

It should be understood that the present application is not limited to the particular configurations and processes described in the above embodiments and illustrated in the drawings. For convenience and simplicity of description, detailed description of any known method is omitted here, and for specific processing of modules and apparatuses described above, reference may be made to corresponding processes in the foregoing method embodiments, which are not repeated here.

FIG. 8 shows a schematic structural diagram of a frame structure configuration system according to an embodiment of the present application. As shown in FIG. 8, the frame structure configuration system includes a 5G base station 810 and a 5G terminal 820 in a 5G network. The frame structure configuration system may be applied to airplane airlines or ocean airlines, for example, in an ultra-long-distance coverage scenario in which the distance between the 5G base station 810 and the 5G terminal 820 is greater than or equal to 100 kilometers. The following steps S801 to S804 may be adopted to implement the frame structure configuration method for a long-distance communication being performed between the 5G base station 810 and the 5G terminal 820.

At step S801, obtaining a real-time distance between the 5G base station 810 and the 5G terminal 820.

For example, the real-time distance between the 5G base station 810 and the 5G terminal 820 may be obtained through a global positioning system (GPS), or the real-time distance between the 5G base station 810 and the 5G terminal 820 may be calculated by extracting time information from real-time measurement information reported by the 5G terminal 820 to the 5G base station 810, in combination with a propagation speed of a wireless signal. The above method for obtaining the real-time distance between the 5G base station 810 and the 5G terminal 820 is only an example, and may be specifically set according to specific situations, and other methods for obtaining the real-time distance that are not described herein are also within the protection scope of the present application, and will not be detailed herein.

At step S802, calculating and obtaining a time length occupied by a GP according to the obtained real-time distance and the propagation speed of the wireless signal.

For example, the time length T occupied by the GP may be calculated and obtained by using the following formula:

$$T = \frac{2*d}{C},$$

T represents the time length occupied by the GP, d represents the real-time distance between the 5G base station 810 and the 5G terminal 820, and C represents the propagation speed of the wireless signal, e.g., the propagation speed of the wireless signal is the speed of light, i.e., about 300000 km/s.

At step S803, determining an adaptive frame structure according to the real-time distance between the 5G base station 810 and the 5G terminal 820.

It should be noted that, in an ultra-long-distance coverage scenario, such as airplane airlines or ocean airlines, since most of services performed by users are downloading services, and the time length occupied by the GP is much longer than that in a normal application scenario, for a communication between the 5G base station 810 and the 5G terminal 820, if a frame structure is configured according to a first frame structure (a time length occupied by each frame is 5 milliseconds) or a second frame structure (a time length occupied by each frame is 10 milliseconds) used in the normal application scenario, it will result in a low number of downlink subframes within a wireless frame, which cannot meet service expectations of the 5G terminal 820. In the embodiment, two wireless frames are combined into one wireless super-frame (each super-frame occupies 20 ms), and the wireless super-frame is used to configure the frame structure for the communication between the 5G base station 810 and the 5G terminal 820, so as to increase an occupation ratio of downlink subframes and meet the service expectations of users.

The time length occupied by the GP is determined according to the real-time distance between the base station and the terminal, and the adaptive frame structure is determined according to the time length occupied by the GP, so that the adaptive frame structure can be dynamically adjusted according to the real-time distance, a waste of wireless resources is avoid, the performance of the terminal in downlink services is improved and the user experience is improved.

FIG. 9 is a schematic composition diagram of an adaptive frame structure, in a case where a distance between a 5G base station and a 5G terminal is 300 kilometers or 250 kilometers, according to an embodiment of the present application.

In a case where the real-time distance is 300 km and the subcarrier spacing is 30 KHz, for the communication between the 5G base station 810 and the 5G terminal 820, the frame structure may be configured using the adaptive frame structure shown in FIG. 9, regardless of a conversion delay of the device. Each time slot occupies 14 OFDM symbols, and the GP occupies at least 56 OFDM symbols (i.e., four special (F) time slots are occupied by the GP completely), and there are four F time slots between a downlink (D) time slot and an uplink (U) time slot, so as to ensure that the adaptive frame structure can meet the communication expectation between the 5G base station 810 and the 5G terminal 820.

In a case where the real-time distance is 250 km and the subcarrier spacing is 30 KHz, for the communication between the 5G base station 810 and the 5G terminal 820, the frame structure may be configured using the adaptive frame structure shown in FIG. 9, regardless of a conversion delay of the device. Each time slot occupies 14 OFDM symbols, and the GP occupies at least 47 OFDM symbols, that is, the GP occupies three complete F time slots (i.e., the first F time slot to the third F time slot), and also occupies 5 OFDM symbols in the fourth F time slot, and the remaining 9 OFDM symbols in the fourth F time slot may be used to transmit uplink (U) symbols or downlink (D) symbols, so as to ensure that the adaptive frame structure can meet the communication expectation between the 5G base station 810 and the 5G terminal 820.

Figures 10, 11, 12:
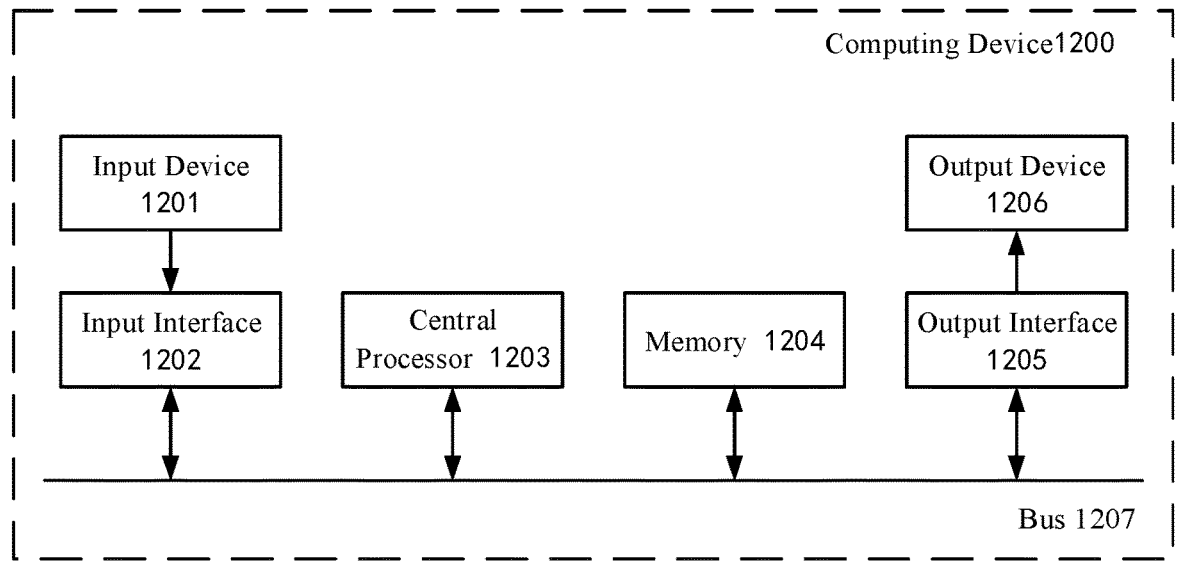
FIG. 10 is a schematic composition diagram of an adaptive frame structure for a distance between a 5G base station and a 5G terminal being about 200 km according to the present application.
FIG. 11 is a schematic composition diagram of an adaptive frame structure for a distance between a 5G base station and a 5G terminal being about 100 km or about 150 km according to the present application.
FIG. 12 is a structural diagram illustrating an exemplary hardware architecture of a computing device for implementing a frame structure configuration method or an information transmission method according to the present application.

FIG. 10 is a schematic composition diagram of an adaptive frame structure, in a case where a distance between a 5G base station and a 5G terminal is 200 kilometers, according to an embodiment of the present application.

In a case where the real-time distance is 200 km and the subcarrier spacing is 30 KHz, for the communication between the 5G base station 810 and the 5G terminal 820, the frame structure may be configured using the adaptive frame structure shown in FIG. 10, regardless of a conversion delay of the device. Each time slot occupies 14 OFDM symbols, and the GP occupies at least 37.3 (about 38) symbols, i.e., the GP occupies two complete F time slots (i.e., the first F time slot and the second F time slot), and also occupies 10 OFDM symbols in the third F time slot, and the remaining 4 OFDM symbols in the third F time slot may be used to transmit U symbols or D symbols.

FIG. 11 is a schematic composition diagram of an adaptive frame structure, in a case where a distance between a 5G base station and a 5G terminal is 100 km or 150 km, according to an embodiment of the present application.

In a case where the real-time distance is 150 km and the subcarrier spacing is 30 KHz, for the communication between the 5G base station 810 and the 5G terminal 820, the frame structure may be configured using the adaptive frame structure shown in FIG. 11, regardless of a conversion delay of the device. Each time slot occupies 14 OFDM symbols and the GP occupies at least 28 OFDM symbols, i.e. the GP occupies two complete F time slots (the first F time slot and the second F time slot).

In a case where the real-time distance is 100 km and the subcarrier spacing is 30 KHz, for the communication between the 5G base station 810 and the 5G terminal 820, the frame structure may be configured using the adaptive frame structure shown in FIG. 11, regardless of a conversion delay of the device. Each time slot occupies 14 OFDM symbols, and the GP occupies at least 19 OFDM symbols, i.e., the GP occupies one complete F time slot (i.e., the first F time slot), and also occupies 5 OFDM symbols in the second F time slot, and the remaining 9 OFDM symbols in the second F time slot may be used to transmit U symbols or D symbols.

During the 5G base station 810 and the 5G terminal 820 communicating with each other initially, the adaptive frame structure shown in FIG. 9 may be used for the communication, and with changing of the real-time distance between the 5G base station 810 and the 5G terminal 820, the adaptive frame structure may be updated to the adaptive frame structure shown in FIG. 10 or FIG. 11, so as to meet the real-time service expectation of the user.

At step S804, generating, by the 5G base station 810, a re-configuration message according to the adaptive frame structure dynamically adjusted, and issues the re-configuration message to the 5G terminal 820, so that frame structures used by the 5G base station 810 and the 5G terminal 820 are synchronized.

For example, if the real-time distance between the 5G base station 810 and the 5G terminal 820 is 100 kilometers, the adaptive frame structure may be updated to the frame structure shown in FIG. 11. Upon receiving the re-configuration message issued by the 5G base station 810, the 5G terminal 820 performs uplink and downlink data transmission according to the updated adaptive frame structure.

In some implementations, if the 5G terminal 820 adjusts the adaptive frame structure in real-time, the adjusted adaptive frame structure may be reported to the 5G base station 810, so that the 5G base station 810 can perform real-time parsing on the message sent by the 5G terminal 820 according to the adjusted adaptive frame structure, thereby ensuring normal communication and reducing the consumption of time slot resources.

It should be noted that, in a case where the 5G terminal 820 adjusts the adaptive frame structure in real-time, the 5G base station 810 still uses the frame structure initially configured (such as the frame structure shown in FIG. 11) to framing, but the 5G base station 810 uses the adaptive frame structure (such as the frame structure shown in FIG. 9) corresponding to the 5G terminal 820 to communicate with the 5G terminal 820, so as to ensure that other terminals in the coverage area of the cell can perform normal communication with the 5G base station 810.

The re-configuration message may include any one or more of parameters such as the number of GPs (or the number of OFDM symbols that the GP occupies), the number of downlink OFDM symbols and the number of uplink OFDM symbols in the F time slot, and an uplink and downlink transmission period. For example, in a case where the real-time distance is 100 kilometers, the number of the OFDM symbols occupied by the GP is 19, the uplink and downlink transmission period is changed to 4 milliseconds, and a total number of downlink OFDM symbols and uplink OFDM symbols in the F time slot is 9.

In the embodiment, the number of the time slots occupied by the GP is determined according to the real-time distance between the 5G base station and the 5G terminal and the propagation speed of the wireless signal, in a communication scenario of an ultra-long distance coverage, the number of the time slots occupied by the GP can be dynamically adjusted according to the real-time distance; according to the number of the time slots occupied by the GP, the number of the uplink time slots and the number of the downlink time slots, the adaptive frame structure for the data communication between the base station and the terminal is determined, which can reduce the loss of time slot resources caused by the GP, avoid a waste of wireless resources, and dynamically adjust the number of the downlink time slots according to the real-time distance between the 5G terminal and the 5G base station, improve the performance of the terminal in downlink services and improve the user experience.

FIG. 12 is a structural diagram illustrating an exemplary hardware architecture of a computing device for implementing a frame structure configuration method or an information transmission method according to an embodiment of the present application.

As shown in FIG. 12, a computing device 1200 includes an input device 1201, an input interface 1202, a central processor 1203, a memory 1204, an output interface 1205, an output device 1206, and a bus 1207. The input interface 1202, the central processor 1203, the memory 1204, and the output interface 1205 are interconnected through the bus 1207. The input device 1201 and the output device 1206 are connected to the bus 1207 through the input interface 1202 and the output interface 1205, respectively, and then connected to other components of the computing device 1200.

In some implementations, the input device 1201 receives input information from outside and transmits the input information to the central processor 1203 via the input interface 1202; the central processor 1203 processes the input information based on computer-executable instructions stored in the memory 1204 to generate output information, temporarily or permanently stores the output information in the memory 1204, and then transmits the output information to the output device 1206 through the output interface 1205; the output device 1206 outputs the output information to outside of computing device 1200 for users.

In some implementations, the computing device shown in FIG. 12 may be implemented as an electronic device which includes: a memory configured to store a computer program; and a processor configured to execute the computer program stored in the memory to perform the frame structure configuration method or the information transmission method described in above embodiments.

In some implementations, the computing device shown in FIG. 12 may be implemented as a frame structure configuration system which includes: a memory configured to store a computer program; and a processor configured to execute the computer program stored in the memory to perform the frame structure configuration method described in above embodiments.

In some implementations, the computing device shown in FIG. 12 may be implemented as an information transmission system which includes: a memory configured to store a computer program; and a processor configured to execute the computer program stored in the memory to perform the information transmission method described in above embodiments.

An embodiment of the present application further provides a computer-readable storage medium, storing a computer program thereon, the computer program, executed by a processor, causes the processor to implement the frame structure configuration method or the information transmission method described in above embodiments.

The above are merely exemplary embodiments of the present application, and are not intended to limit the scope of the present application. In general, the various embodiments of the present application may be implemented in hardware, special circuits, software, logic or any combination thereof. For example, some aspects may be implemented in hardware, while other aspects may be implemented in firmware or software which may be executed by a controller, microprocessor or any other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembly instructions, instruction set architecture (ISA) instructions, machine-related instructions, microcode, firmware instructions, state setting data, or source or object codes written in any combination of one or more programming languages.

The block diagrams of any logic flow in the figures of the present application may represent program steps, or may represent interconnected logic circuits, modules, and functions, or may represent a combination of program steps and logic circuits, modules, and functions. The computer program may be stored in the memory. The memory may be of any type suitable to the local technical environment and may be implemented using any suitable data storage technology, such as, but not limited to, read only memory (ROM), random access memory (RAM), optical storage devices and systems (digital multifunctional disks, DVDs or CD disks), etc. The computer readable medium may include a non-transitory storage medium. The data processor may be of any type suitable to the local technical environment, includes but not limited to general purpose computers, special purpose computers, microprocessors, digital signal processors (DSPs), application specific integrated circuits (ASICs), programmable logic devices (FGPAs), and processors based on a multi-core processor architecture.

The foregoing has provided by exemplary and non-limiting examples a detailed description of exemplary embodiments of the present application. Various modifications and adaptations to the foregoing embodiments become apparent to an ordinary person skilled in the related art in view of the accompanying drawings and the appended claims without departing from the scope of the present application. Accordingly, the proper scope of the present application is determined according to the claims.

The invention claimed is:

1. A frame structure configuration method, comprising:
obtaining a real-time distance between a base station and a terminal;
determining a total number of time slots occupied by a guard period (GP) according to the real-time distance and a propagation speed of a wireless signal;
according to the number of the time slots occupied by the GP, a total number of uplink time slots and a total number of downlink time slots, determining an adaptive frame structure for data transmission between the base station and the terminal;
determining a total number of processes of hybrid automatic repeat request (HARQ) according to the number of the downlink time slots and the number of the uplink time slots in the adaptive frame structure;
determining a feedback delay according to a time interval between the downlink time slot and the uplink time slot; and
updating configuration information for the data transmission between the base station and the terminal according to at least one of the number of the processes of HARQ and the feedback delay,
wherein the updating configuration information for the data transmission between the base station and the terminal according to at least one of the number of the processes of HARQ and the feedback delay, comprises:
generating downlink control information (DCI) according to at least one of the number of the processes of HARQ and the feedback delay; and
updating configuration information of a physical uplink control channel (PUCCH) according to the DCI, and generating updated configuration information of the PUCCH, wherein the updated configuration information of the PUCCH is configured for the data transmission between the base station and the terminal.

2. The method of claim 1, wherein the determining a total number of time slots occupied by a GP according to the real-time distance and a propagation speed of a wireless signal, comprises:
calculating a time length occupied by the GP according to the real-time distance and the propagation speed of the wireless signal;
determining a total number of orthogonal frequency division multiplexing (OFDM) symbols corresponding to the GP according to the time length occupied by the GP and a time length corresponding to each OFDM symbol; and
determining the number of the time slots occupied by the GP according to the number of the OFDM symbols corresponding to the GP and a total number of OFDM symbols corresponding to each time slot.

3. The method of claim 1, wherein the determining a total number of processes of HARQ according to the number of the downlink time slots and the number of the uplink time slots in the adaptive frame structure, comprises:
determining a total number of processes of downlink HARQ according to the number of the downlink time slots;
determining a total number of processes of uplink HARQ according to a corresponding relation of transmission delay between the uplink time slot and the downlink time slot; and
determining the number of the processes of HARQ according to the number of the processes of downlink HARQ and the number of the processes of uplink HARQ.

4. The method of claim 1, wherein the generating a DCI according to at least one of the number of the processes of HARQ and the feedback delay, comprises:
calculating a byte length, to be filled, occupied by at least one of the number of the processes of HARQ and the feedback delay;
increasing a transmission byte length occupied by the DCI according to the byte length to be filled and a byte length for filling preset information, and generating new DCI; and
filling at least one of the number of the processes of HARQ and the feedback delay into the new DCI.

5. The method of claim 1, wherein the generating a DCI according to at least one of the number of the processes of HARQ and the feedback delay, comprises:
calculating a byte length, to be filled, occupied by at least one of the number of the processes of HARQ and the feedback delay; and
filling at least one of the number of the processes of HARQ and the feedback delay into the DCI according to the byte length to be filled, a length of an idle field in the DCI and a preset filling byte length.

6. The method of claim 1, further comprising:
after determining the adaptive frame structure for the data transmission between the base station and the terminal according to the number of the time slots occupied by the GP, the number of the uplink time slots and the number of the downlink time slots, updating configuration information corresponding to the adaptive frame structure to generate updated configuration information of the frame structure;
generating an updating message according to the updated configuration information of the frame structure; and updating the adaptive frame structure according to the updating message.

7. The method of claim 6, wherein the updating the adaptive frame structure according to the updating message, comprises:

updating frame structures used by the base station and the terminal into the adaptive frame structures according to the updating message.

8. The method of claim 6, wherein the updating the adaptive frame structure according to the updating message, comprises:

updating the frame structure used by the terminal to the adaptive frame structure according to the updating message; and keeping the frame structure used by the base station unchanged as a preset frame structure, and enabling the base station to parse each received communication message sent by the terminal according to the updating message.

9. The method of claim 1, wherein the adaptive frame structure comprises at least one wireless super-frame, each wireless super-frame comprises at least two wireless frames, each wireless frame comprises at least N time slots, and Nis an integer greater than or equal to 1.

10. An electronic device, comprising:

at least one processor; and a memory having at least one computer program stored thereon, the at least one computer program, executed by the at least one processor, causes the at least one processor to implement the frame structure configuration method according to claim 1.

11. A non-transitory computer-readable storage medium, storing a computer program thereon, the computer program, executed by a processor, causes the processor to implement the frame structure configuration method according to claim 1.

12. A frame structure configuration method, comprising:

obtaining a real-time distance between a base station and a terminal;

determining a total number of time slots occupied by a guard period (GP) according to the real-time distance and a propagation speed of a wireless signal;

according to the number of the time slots occupied by the GP, a total number of uplink time slots and a total number of downlink time slots, determining an adaptive frame structure for data transmission between the base station and the terminal;

determining a total number of processes of hybrid automatic repeat request (HARQ) according to the number of the downlink time slots and the number of the uplink time slots in the adaptive frame structure;

determining a feedback delay according to a time interval between the downlink time slot and the uplink time slot; and updating configuration information for the data transmission between the base station and the terminal according to at least one of the number of the processes of HARQ and the feedback delay, wherein the determining a total number of processes of HARQ according to the number of the downlink time slots and the number of the uplink time slots in the adaptive frame structure, comprises:

determining a total number of processes of downlink HARQ according to the number of the downlink time slots;

determining a total number of processes of uplink HARQ according to a corresponding relation of transmission delay between the uplink time slot and the downlink time slot; and determining the number of the processes of HARQ according to the number of the processes of downlink HARQ and the number of the processes of uplink HARQ.

13. A frame structure configuration method, comprising:

obtaining a real-time distance between a base station and a terminal;

determining a total number of time slots occupied by a guard period (GP) according to the real-time distance and a propagation speed of a wireless signal;

according to the number of the time slots occupied by the GP, a total number of uplink time slots and a total number of downlink time slots, determining an adaptive frame structure for data transmission between the base station and the terminal; and in response to a change value of the real-time distance reaching or exceeding a preset distance threshold, dynamically updating the adaptive frame structure, the method further comprises:

after determining the adaptive frame structure for the data transmission between the base station and the terminal according to the number of the time slots occupied by the GP, the number of the uplink time slots and the number of the downlink time slots, determining a total number of processes of hybrid automatic repeat request (HARQ) according to the number of the downlink time slots and the number of the uplink time slots in the adaptive frame structure;

determining a feedback delay according to a time interval between the downlink time slot and the uplink time slot; and updating configuration information for the data transmission between the base station and the terminal according to at least one of the number of the processes of HARQ and the feedback delay, wherein the updating configuration information for the data transmission between the base station and the terminal according to at least one of the number of the processes of HARQ and the feedback delay, comprises:

generating downlink control information (DCI) according to at least one of the number of the processes of HARQ and the feedback delay; and updating configuration information of a physical uplink control channel (PUCCH) according to the DCI, and generating updated configuration information of the PUCCH, wherein the updated configuration information of the PUCCH is configured for the data transmission between the base station and the terminal.

* * * * *